(12) United States Patent
Vaisband

(10) Patent No.: US 10,791,100 B2
(45) Date of Patent: Sep. 29, 2020

(54) SYSTEMS, METHODS AND DEVICES FOR SECURE ROUTING AND RECORDING OF NETWORK DATA TRANSPORTED THROUGH NETWORK SWITCH

(71) Applicant: OVSECURE LTD, Nesher (IL)

(72) Inventor: Oleg Vaisband, Nesher (IL)

(73) Assignee: OVSECURE LTD., Nesher (IL)

( * ) Notice: Subject to any disclaimer, the term of this patent is extended or adjusted under 35 U.S.C. 154(b) by 251 days.

(21) Appl. No.: 15/917,614

(22) Filed: Mar. 10, 2018

(65) Prior Publication Data
US 2018/0262475 A1 Sep. 13, 2018

Related U.S. Application Data

(60) Provisional application No. 62/469,602, filed on Mar. 10, 2017.

(51) Int. Cl.
| | |
|---|---|
| *H04L 29/06* | (2006.01) |
| *H04L 9/06* | (2006.01) |
| *H04L 12/773* | (2013.01) |
| *H04L 12/931* | (2013.01) |

(52) U.S. Cl.
CPC ........ *H04L 63/0457* (2013.01); *H04L 9/0618* (2013.01); *H04L 63/0227* (2013.01); *H04L 63/0435* (2013.01); *H04L 63/0478* (2013.01); *H04L 63/0485* (2013.01); *H04L 63/16* (2013.01); *H04L 9/0625* (2013.01); *H04L 9/0631* (2013.01); *H04L 45/60* (2013.01); *H04L 49/00* (2013.01); *H04L 63/0823* (2013.01); *H04L 2209/127* (2013.01)

(58) Field of Classification Search
CPC ............. H04L 63/0457; H04L 63/0435; H04L 63/227; H04L 2209/127
See application file for complete search history.

(56) References Cited

U.S. PATENT DOCUMENTS

| | | | | |
|---|---|---|---|---|
| 2013/0003966 | A1* | 1/2013 | Ihle | ......... G06F 21/72 380/44 |
| 2016/0021402 | A1* | 1/2016 | LaBosco | ............ H04N 21/4398 725/31 |

* cited by examiner

*Primary Examiner* — Dao Q Ho
(74) *Attorney, Agent, or Firm* — Guy Levi; The IP Law Firm of Guy Levi, LLC

(57) ABSTRACT

The disclosure relates to systems, methods and devices for secure routing and recording of network data streams passing through a network switch. Specifically, the disclosure relates to systems, methods and devices for reversibly deconstructing networks' OSI L1-L7 in time and space, in the process of selectively recording network data streams for secure access, as well as providing external rule-based security auditing and functioning as a black-box in industry-specific applications.

33 Claims, 4 Drawing Sheets

SYSTEMS, METHODS AND DEVICES FOR SECURE ROUTING AND RECORDING OF NETWORK DATA TRANSPORTED THROUGH NETWORK SWITCH

COPYRIGHT NOTICE

A portion of the disclosure hereinbelow contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems, methods and devices for secure routing and recording of network data streams passing through a network switch. Specifically, the disclosure is directed to systems, methods and devices for reversibly deconstructing networks' OSI L1-L7 in time and space, in the process of selectively recording network data streams for secure access.

Over the recent past, networks such as, for example, Supervisory Control and Data Acquisition (SCADA) and automation control equipment used in mission-critical industrial systems such as liquid natural gas distribution, as well as electricity generation and distribution, oil production, transportation, manufacturing, financial services and health services has become increasingly interconnected through the use of popular communications technologies such as Ethernet, TCP/IP and web services.

As heretofore isolated and air-gapped devices and networks become accessible from around the world, this increased interconnectedness has also exposed these systems to the possibility of attack from viruses, hackers, cyber criminals and terrorists. Currently there are numerous poorly protected control devices spanning the globe. These are tasked with the safe operation of critical (as well as non-critical) systems and infrastructure such as power transmission substations, gas pipelines, manufacturing plants, financial institutions and the like, yet at the same time remain largely unprotected from malicious persons who may target them for attack through the network.

To date, most security solutions are typically based on central firewalls protecting unsecured internal devices or computers from the outside world, a design that cannot address the requirements of the industrial controls world, or for entities requiring increased network security. Once a virus or hacker manages to get past (or is already inside) the traditional firewall, the devices protected by the firewall, such as a typical programmable logic controller (PLC) or distributed control system (DCS) is an easy target for attack.

To ameliorate some of the risks, a variety of cryptographic techniques are known for securing transactions in data networks. For example, the SSL protocol (and its replacement TLS) provides a mechanism for securely sending data between a server and a client. Briefly, the SSL provides a protocol for authenticating the identity of the server and the client and for generating an asymmetric (private-public) key pair. The key generation process securely provides the client and the server with unique cryptographic keys that enable each of them, but not others, to encrypt or decrypt data they send to each other via the network. In practice, a system may include many levels of cryptographic protection and once a higher-level key is compromised, all subsequent (e.g., lower) levels may be compromised as well. Moreover, higher level keys tend to be used for relatively long periods of time. Thus, the potential for harm is much greater. Accordingly, protection of higher level keys is a primary goal in any cryptographic security system, whether hardware or software-based.

Components such as a hardware security module ("HSM"), which may be used to provide a higher level of security for applications that are mission critical and therefore are very security-sensitive, are typically constructed as multi-chip boards potted with an epoxy material to provide very strong security. However, due to the use of the epoxy material and the functional key management requirements, these modules are typically very expensive devices with a large system footprint (e.g., full, multi-shelved cabinets) and limited capabilities outside of key management.

These and other shortcomings of the current state of affairs are addressed by the following disclosure, figures and claims.

SUMMARY

Disclosed, in various embodiments, are systems, methods and devices for secure routing and recording of network data streams passing through a network switch.

In an embodiment provided herein is a system for secure network routing and data recording comprising: a communication processing module; a secure hardware module operably coupled to the communication processing module; a network switch in two way communication with the communication processing module; a non-volatile memory module in two way communication with the communication processing module; and a central processing unit coupled to a transceiver, the central processing unit having thereon a processor-readable medium coupled to a memory having thereon a set of instructions configured to transmit and receive data from the communication processing module, wherein the secure hardware module is adapted to provide a selectably reversible temporospatial disconnect among the network's: data link layer, and/or network layer, and/or transport layer, and/or application layer and/or a combination of the foregoing.

In another embodiment, provided herein is a method for secure routing and recording of network data stream passing through a network switch implementable in a system comprising a communication processing module, a secure hardware module operably coupled to the communication processing module, a network switch having a plurality of network ports in two way communication with the communication processing module, a non-volatile memory module in two way communication with the communication processing module, and a central processing unit coupled to a transceiver, the central processing unit having thereon a processor-readable medium coupled to a memory having thereon a set of instructions configured to transmit and receive data from the communication processing module, wherein the secure hardware module is adapted to provide a selectably reversible, temporospatial disconnect among the network's: data link layer, and/or network layer, and/or transport layer, and/or application layer and/or a combination of the foregoing, the method comprising receiving a network data stream through the network ports to the network switch; based on predetermined criteria, routing the network data stream or portions thereof to the communication processing module via a data conduit; using the communication processing module, processing the network data stream or portion thereof thereby recording the network data stream; and storing the recorded network data stream or portion thereof on the non-volatile memory module.

In yet another embodiment, provided herein is an apparatus for providing secure routing and recording of a network data stream passing through a network switch, the apparatus comprising: circuitry and a communication processor in communication with a non-volatile memory having thereon processor-readable firmware, the communication processor and circuitry adapted to provide a selectably reversible, temporospatial disconnect among the network's: data link layer, and/or network layer, and/or transport layer, and/or application layer and/or a combination of the foregoing.

These and other features of the systems, methods and devices for secure routing and recording of network data streams passing through a network switch, will become apparent from the following detailed description when read in conjunction with the figures and examples, which are exemplary, not limiting.

BRIEF DESCRIPTION OF THE FIGURES

For a better understanding of the colored resin-metal fabrication methods and compositions, with regard to the embodiments thereof, reference is made to the accompanying examples and figures, in which.

DETAILED DESCRIPTION

Provided herein are embodiments of systems, methods and devices for reversibly deconstructing networks' OSI L1-L7 in time and space, in the process of selectively recording network data streams for secure access, as well as selectively authorizing and/or blocking access at each level.

Therefore, provided herein is a hardware integrated system comprising in an embodiment, a communication processor, a secure hardware-based system, that may be integrated into the communication processor, a Network switch, and dedicated Data storage. Coupling the communication processor to the Network switch with dedicated control channel and DATA provide unique secure and reliable solution for secure routing and recording of network data streams passing through the network switch. The secure hardware-based subsystem or module, is adapted to protect CPU (in other words, the communication processor's) firmware and achieve both secure configuration of the network switch and the recording.

The term "system" shall also be taken to include any collection of systems or sub-systems that individually or jointly execute a set, or multiple sets, of instructions to perform one or more functions. Also, the term "system" refers to a logical assembly arrangement of multiple devices and is not restricted to an arrangement wherein all of the component devices are in the same housing. For example and in an embodiment, the CPM (1), HSM (4), network switch (2), and data storage means (see hereinbelow), are all incorporated within a single housing having dimension of between about 3.5 inch×4.5 inch×0.5 inch, and about 5.25 inch×6.5 inch×2.0 inch. Larger sizes are also contemplated in circumstances where the device (apparatus) is used, for example as a black box for automotive application.

Figure 1:
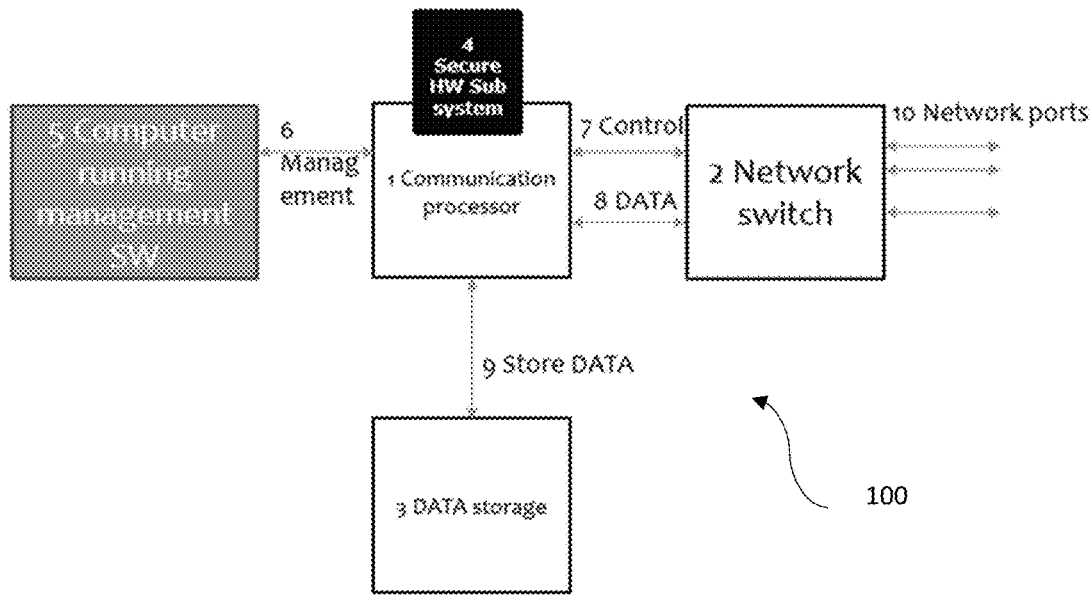
FIG. 1 Illustrates high-level system architecture schematic.
Figure 4:
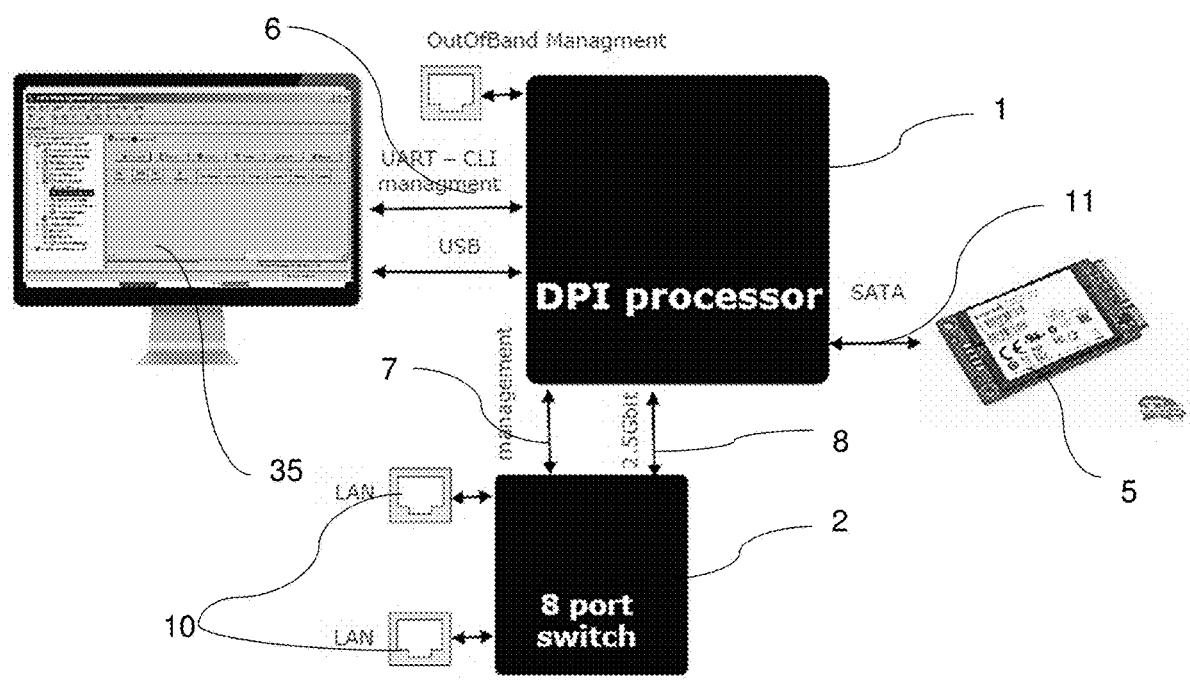
FIG. 4, illustrates architecture for secure switch with layer-specific network recording and DPI.

In an embodiment, and as illustrated in FIG. 1, and FIG. 4, Data in DATA storage may or may not be encrypted using, for example; AES, 3DES or any other encryption algorithm while Subsystem[4] holds decryption keys. Access to data is enabled only via dedicated management ports [6] and not via external network interfaces [10]. Management ports [6] may be implemented as, for example; USB port, Serial port, RJ45 port, Fiber port and the like. In circumstances when stored (in other words, recorded) Data (or network data stream(s)) is encrypted, the network data stream(s) can be decrypted before readout or on computer system [5] using pre-shared decryption key (PDK), which is unique for each device which includes the communication processor and the secure hardware-based subsystem (or module).

For example, Network switch [2] routes network data stream from Networks port(s) [10]. Based on stored configuration (in other words, predetermined recording parameters), the network switch can be configured to send all network data streams or only those data streams matching specific the specific preconfigured criteria to communication processor [1] via dedicated data channel [8]. This received network data stream (whether the whole stream, or criteria-specific portions thereof) is processed and stored in storage database [3] (whether encrypted or not). Stored network data may be overwritten after predefined time or event (e.g., based on the preconfigured recording parameters). Computer system [5] connected to the device [4+1] can, for example; modify the recording configuration, and/or read recorded data. All communication on dedicated management channel through management port [6] can be configured to require secure handshake to authenticate computer system [5] before it can operate on device [4+1]. Secure HW sub-system (or module) [4] can be adapted to further be responsible for protection of communication processor's [1] firmware (FW) and storage of secure keys; as well as also handle tamper protection features, (e.g., virus scan, firewall settings, administrative setting changes, etc.)

In addition, hardware-based device [4+1] may further power to devices connected to network ports and be adapted to support, for example, POE, POE+, POE++, or a combination of the foregoing. Device [4+1] can alternatively be powered form an external source (for example electric grid or POE), UPS, solar cells, or an internal battery.

Accordingly and in an embodiment illustrated for example, in FIG. 1, provided herein is system 100 for secure network routing and data recording comprising: communication processing module (1); secure hardware module (SHM) (4) operably coupled to communication processing module (1), or, in another embodiment, forming a single module with communication processing module (1). Also showing in system 100 is network switch (2) in two way communication with communication processing module (CPM) (1). As illustrated, network switch (2) is coupled to CPM (1) via two discrete communication channels; data communication channel (8) and control communication channel (7). Non-volatile memory module (3) is illustrated to be in two way communication with CPM (1) via data storage (and recording) channel (9). Also illustrated is computerized system (5) with a central processing unit (CPU) coupled to a transceiver (11 not shown), the CPU having thereon a processor-readable medium coupled to a memory with a set of instructions configured to transmit and receive data from CPM (1). Secure hardware module (SHM)

(4) being adapted to provide a selectably reversible temporospatial disconnect among, or deconstruct and reconstruct the network's data link layer, and/or network layer, and/or transport layer, and/or application layer and/or a combination of the foregoing. Also illustrated, are plurality of network ports 10.

Figure 2A:
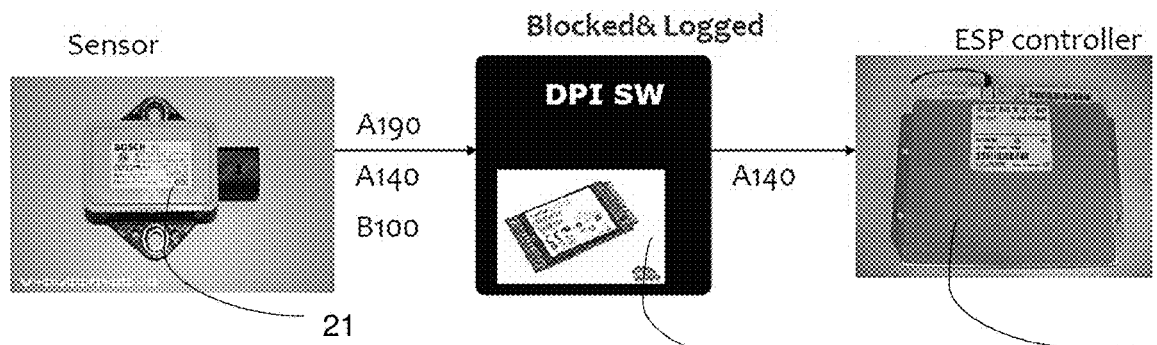
FIG. 2A, illustrates a IoT/IoE/Automotive specific DPI example of incoming query from a sensor that based on predefined rules, which is blocked and logged as illustrated in FIG. 2B.
Figure 2B:
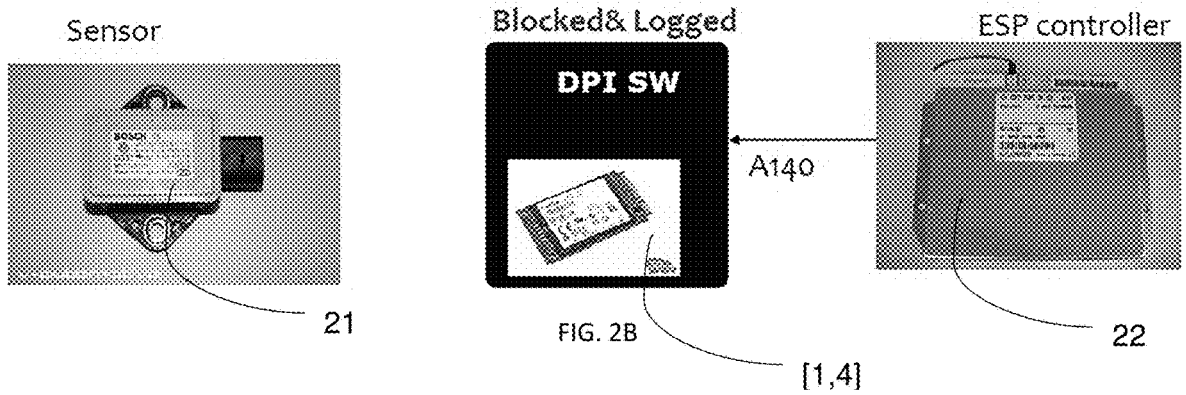

Another example is illustrated in FIGS. 2A, 2B where an industrial sensor 21, for example a camera, sends at LAN network L4 level, to industrial controller 22, a signal representing data collected by sensor 21 from camera of 140°, and a signal representing data collected by sensor 21 from camera angle of 190° (see e.g., FIG. 2A). Assuming predefined camera angles between 0-180°, Device [4,1]] will only allow signal within the predefined parameters (140°) to reach controller 22, while blocking and recording the data from the 190°. (See e.g., FIG. 2B)

As indicated, the network data stream(s) can be recorded (or stored) on the non-volatile memory module, serving as a secure database for the system. The data form the network data stream(s), recorded by the system can optionally be encrypted using advanced encryption standard (AES, or Rijndael), referring to the symmetric 128-bit block data encryption technique, and/or triple data encryption standard (3DES) referring to the 3× nested encryption using 64-bit blocks for a total of 192-bits, and/or or a combination thereof. In circumstances where the network data stream(s) is encrypted, HSM (4) can further comprise a firmware with a decryption key configured to decrypt the encrypted data, which can be pre-shared device-specific decryption key. In an embodiment, data encryption techniques can use 256-bit encryption, or 2× 128-bit encryption, and use various other protocols, for example, PRESENT®, CLEFIA® and the like, or hardware-oriented stream cyphers, for example; ENCORO®, or PHOTON®.

To facilitate encryption/decryption protocol, in another embodiment, the system may further comprise an encryption/decryption accelerator, in communication with HSM (4) or CPM (1). The encryption accelerator may be configured to encrypt and decrypt information in accordance with a plurality of cryptographic functions, receive a command from CPM (1) to perform an encryption or decryption task upon network data stream associated with an input/output operation, and in response to receiving the command, encrypt or decrypt the network data stream associated with the input/output operation based on a particular one of the plurality of cryptographic functions.

The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads). Likewise, "network switch" refers to a network device which receives data at multiple input ports (10) and provides that data to an output port (e.g., capable of returning a value in an ARP table), for transmission over a communication link, and may also include computer networking devices such as a hub, router, bridge, gateway, multilayer switch and the like.

In addition, the computer program (software and/or firmware), can comprise program code means for carrying out the steps of the methods described herein, as well as a computer program product comprising program code means stored on a medium that can be read by a computer, such as a floppy disk, a hard disk, CD-ROM, DVD, USB memory stick, or a storage medium that can be accessed via a data network, such as the Internet or Intranet, when the computer program product is loaded in the main memory of a computer and is carried out by the computer.

Memory device(s) as used in the methods described herein can be any of various types of non-volatile memory devices or storage devices (in other words, memory devices that do not lose the information thereon in the absence of power). The term "memory device" is intended to encompass an installation medium, e.g., a CD-ROM, floppy disks, or tape device or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Further, CPM (1) may be operably coupled to the various modules and components with appropriate circuitry, may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. Accordingly and in an embodiment, the central processing unit used in the systems, methods and devices disclosed herein can be in communication with CPM (1) via management port (6), for example is a USB port, a Serial port, a RJ45 port, or a Fiber port.

To support management communications, system's 100 CPM (1) and computerized system (5) can be adapted to implement a predetermined port (e.g., port 0 (zero)) as a management port. Thereafter management packets directed to and/or from CPM (1) can be addressed to that port (port 0 e.g.). For this purpose, management port (6) can have its own local identifier (LID—the link-layer address in the secure data network), which can be assigned to it by a subnet manager (SM), or in another embodiment, be specific to the device (e.g., CPM (1) and HSM (4)). When the subnet manager agent (SMA) runs on an embedded CPU within CPM (1), management port (6) can be an internal management port; otherwise, management port (6) can be configured for connection to external computerized system (5).

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers.

As may also be used herein, the terms "communication processing module" (CPM), "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). CPM (1), processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information.

Note that if CPM (1), module, processing circuit, and/or processing unit includes more than one processing device, the processing devices may be centrally located (e.g., directly coupled together to HSM (4) via a wired and/or wireless bus structure) or may be distributed (e.g., cloud computing via indirect coupling via a local area network and/or a wide area network). Further note that if CPM (1), module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and CPM (1), module, processing circuit, and/or processing unit executes, hard coded and/or operational instructions corresponding to at least some of the steps and/or functions illustrated in one or more of FIG. 1. Such a memory device or memory element can be and is included in an embodiment as an article of manufacture.

Accordingly and in an embodiment, provided herein is an apparatus or device for providing secure routing and recording of a network data stream passing through a network switch, the apparatus comprising: circuitry and a communication processor in communication with a non-volatile memory having thereon processor-readable firmware, the communication processor and circuitry adapted to provide a selectably reversible, temporospatial disconnect among the network's: data link layer, and/or network layer, and/or transport layer, and/or application layer and/or a combination of the foregoing.

As used herein, the term "processor" is defined as including, but not necessarily being limited to, an instruction execution system such as a computer/processor-based system, an Application Specific Integrated Circuit (ASIC), a computing device, or a hardware and/or software system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof. In addition, the computer program (software and/or firmware), can comprise program code means for carrying out the steps of the methods described herein, as well as a computer program product comprising program code means stored on a medium that can be read by a computer, such as a hard disk, SATA CD-ROM, DVD, USB memory stick, or a storage medium that can be accessed via a data network, such as the Internet or Intranet, when the computer program product is loaded in the main memory of a computer and is carried out by the computer. Thus, the terms "non-transitory storage medium" and non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media.

The device can be configured to selectably create a temporospatial disconnect between the network layers. The disconnect can be between the application layer, (referring to the network layer at which communication partners are identified, the network capacity is assessed, and that creates a thing to send or opens the thing received) and downstream to the transport layer, and/or network layer, and/or the data link layer. Disconnect can be at any layer and therefore provide a secure routing.

For example, the device can be predefined to do at least one of record, block, and authorize:
Data from/to port (L1-L2)
From/to IP (L3-L4)
From/to IP (L3-L4)
Protocol per port (L3-L4)
Define rules per port (L1-L4)
Output from DPI (L5-L7)
For example, record all: TCPIP stream from port 1 to port 4 & all UDP from MAC1

Example of the algorithm enabling the selectable authorization or recording of the network data to and from each network layer can be:
If data from port or ip or mac not required to be recorded, id L3-L7 inspected
Then configure switch routing tables to pass it directly.
Else
  If just recording need then
    Configure Switch to send mirror data to CPU in addition to passing data
    Else If recoding decision or DPI needed or pass/block criteria cannot be handle by switch
  Then
    Configure Switch to send data to CPU only
    CPU will perform DPI and decide:
    Case:
      Record log, not forward data to destination
      Record log, and data, not forward data to destination (block)
      Record log, and forward data to destination
      Record log, and data, and forward data to destination forward data to destination Furthermore, at least one of CPM (1), HSM (4), and network switch (2), can further comprise Certification Authority (CA) certificates and thus, by issuing a certificate to itself, establish a trust anchor for the whole system. The certificates can be issued in an embodiment to all the system's end entities, such as, for example, components, computer system CPU (5), modules (e.g., memory module (3)), processors, transceivers, network switch (2), connected devices and the like. Under these circumstances, the CA certificate can be adapted to define the certificate path and usage restrictions for all end entity certificates issued for use in the public key infrastructure (PKI). Depending on the apparatus configuration, each of the end entities may or may not be configured to be subordinate CA.

In addition, at least one of CPM (1), HSM (4), and network switch (2) can further be configured to perform at least one of: define protocol per port, define rules per port, limit traffic, QOS, perform packet blocking, establish network filter, establish custom filter, and define XML only parser. Example of filter rules Supported protocols in the device are at least one of MAC (Ethernet), VLAN (802.1Q), STP (Spanning Tree Protocol) ARP/RARP, IPv4, IPv6, TCP/UDP/SCTP, ICMP, IGMP, ESP, AH, UDPLITE, 'ALL', TCP/UDP/SCTP over IPV6, ICMPv6, ESP, AH, UDPLITE, and 'ALL' over IPv6.

Under certain embodiments, the systems described herein can be configured as an industry-specific (e.g., automotive, IoT, IoE) LAN network switch (e.g., router). Definitions available using the device provided herein, configured to provide network specific screening, blocking and recording of data, can be to perform command-specific only parser or Protocol specific, for example BACNET, in other words:

Only BACNET compatible transactions (L3/L4) will be supported (in other words, allowed in the network and all others will be blocked and recorded)

Additional limitation may be added (example—some ports may not be allowed to send some types of queries (L3-L4))—while Controller port may send all types within protocol (L1-L4)

Record all normal transaction for last 24H, record last 1000 abnormal transaction Enables interconnect security audit, e.g., by CSO of rules only, without the need to review all blocked/recorded data/

May act like local black box (BB) in case of security or failure event.

Figure 3:
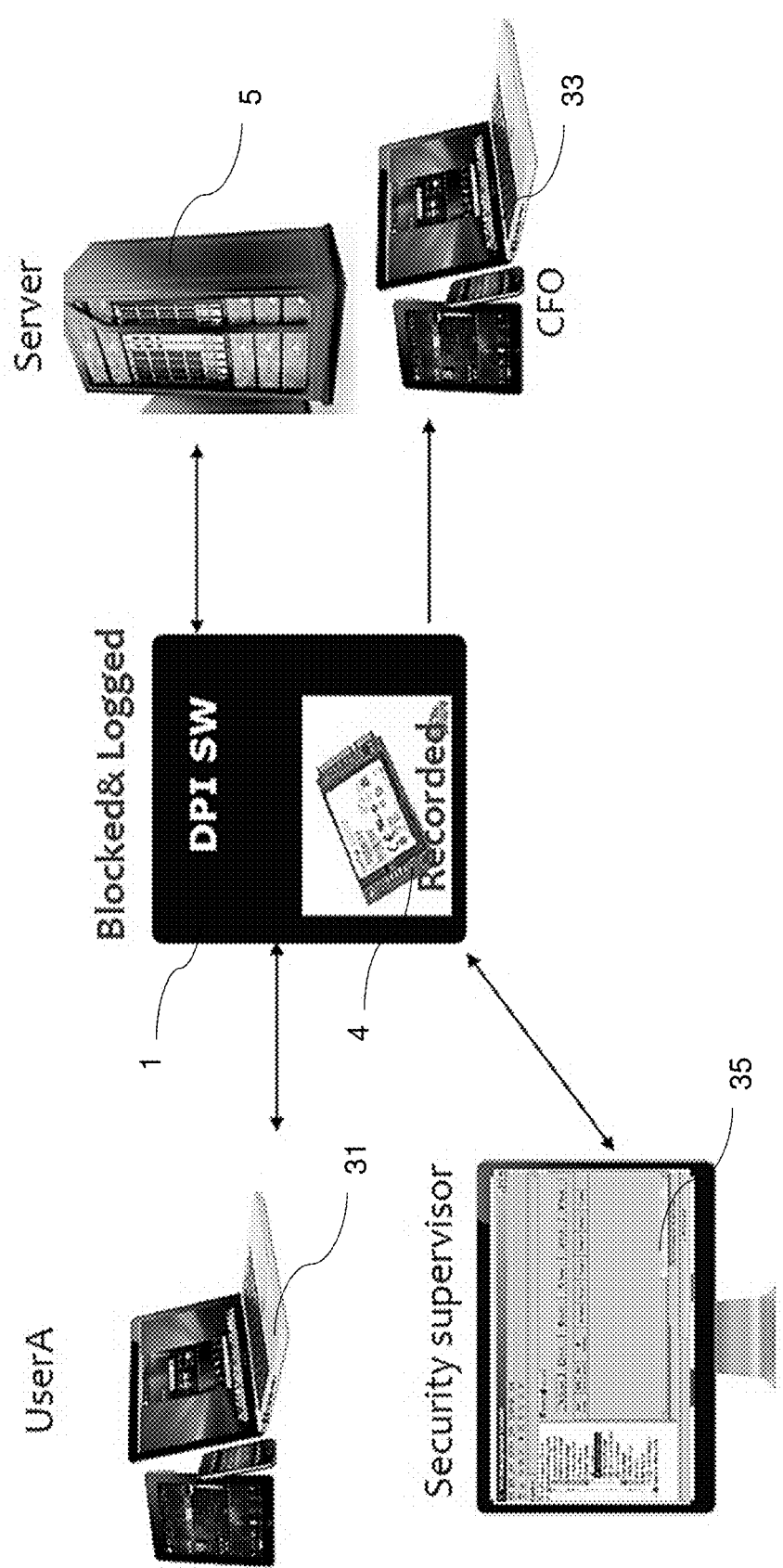
FIG. 3, illustrates the use of the recorder in a LAN system.

Enabling interconnected security audit (see e.g., FIGS. 3, 35) of industry specific networked systems will require design engineers to add rules of traffic in the network that is able to pass among at least two of sensors, controllers, CPU modules, display modules, back end management servers, 4C (critical command and control centers) modules, and SCADA, when combined sensor/subsystem authentication, whereby, for example, fake sensor will be rejected by the device and the event will be recorded. In addition, security review of full rules list will simplify global system security audit and enable to find all potential security breaches and points of exploitation and vulnerability left to resolve. In an embodiment, audit refers to the evaluation of a single network device, for example the apparatus described and claimed herein, to determine its compliance with a policy. The audit typically is directed toward computing security aspects of the network device including controls, applications, procedures, operational aspects, and so forth, instead of separately auditing each device coupled to the system. For example, the audit may evaluate the rules for allowing traffic from each network layer to proceed to each component of the system, for example, ports, communication processor module, storage etc. In one embodiment, an audit may result in the network device providing security information about itself, such as whether data proceeded unblocked to the target address, whether the data was blocked and what triggered the blockage, or the like. Thus, the audit may include a request. In one embodiment, the request is for information about the network device. The audit request may also result in an action or other response by the network device for which the audit may be interested (in other words, validating the rules, or updating the rules). In one embodiment, the audit may also provide recommendations on changes in rules, configuration, security policy, procedures, or the like, based on a result of the audit.

Figure 5:
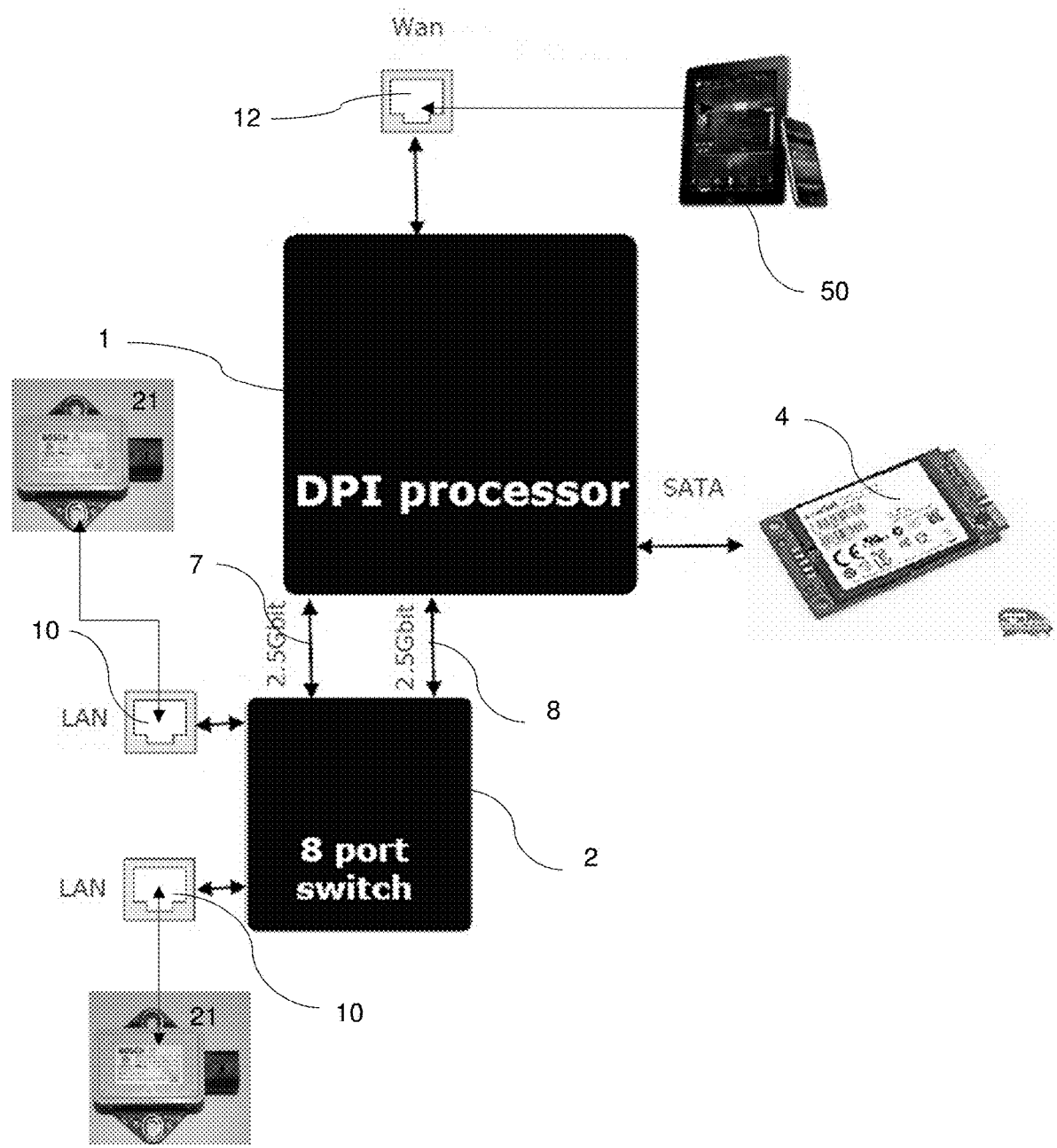
FIG. 5, illustrates automotive gateway architecture.

As indicated, in circumstances where breach, or failure, or an attack is detected, the device can operate as a built in BB, when configured to record certain critical traffic in the network, and may be powered independently of the whole network. In an embodiment, as illustrated in FIG. 5 device [4,1] is independently coupled to transceiver 50 and is configured to provide emergency notification and beacon to report in case the BB automotive, at least one of location, acceleration, and estimated passenger status (see e.g., FIG. 5).

In an embodiment, the systems and apparatuses or devices described herein, are implemented to perform the methods described herein. Accordingly and in another embodiment, provided herein is a method for secure routing and recording of network data stream passing through a network switch implementable in a system comprising a communication processing module, a secure hardware module operably coupled to the communication processing module, a network switch having a plurality of network ports in two way communication with the communication processing module, a non-volatile memory module in two way communication with the communication processing module, and a central processing unit coupled to a transceiver, the central processing unit having thereon a processor-readable medium coupled to a memory having thereon a set of instructions configured to transmit and receive data from the communication processing module, wherein the secure hardware module is adapted to provide a selectably reversible, temporospatial disconnect among the network's: data link layer, and/or network layer, and/or transport layer, and/or application layer and/or a combination of the foregoing, the method comprising receiving a network data stream through the network ports to the network switch; based on predetermined criteria, routing the network data stream or portions thereof to the communication processing module via a data conduit; using the communication processing module, processing the network data stream or portion thereof thereby recording the network data stream; and storing the recorded network data stream or portion thereof on the non-volatile memory module.

In an embodiment, in addition to recording the network data stream(s) based on the initial HSM configuration, the method can further comprise selectively blocking the network data stream(s). For example, selectively blocking the data stream(s) in the methods provided can comprises: transporting the data without recording, transporting the network data stream(s) and recording the network data stream(s), blocking the network data stream(s) from transport to the central processing unit and recording the network data stream(s), or blocking the network data stream(s) from transport to the central processing unit and logging as an event.

The determination on how to selectively filter and/or block and/or transport, and/or block the network data stream(s), can be based on, at least one of: Source port, Destination port, MAC addresses, protocol types, packet sizes, VLAN (802.1Q), or STP (Spanning Tree Protocol).

Filtering can be also based the OSI network layer mapping such as, for example, to the network layer's IPv4, IPv6, TCP/UDP/SCTP, ICMP, IGMP, ESP, AH, UDPLITE, 'ALL', TCP/UDP/SCTP over IPV6, ICMPv6.

The methods can further comprise using the central processing unit of the computerized system and via a management port: modifying the recorded network data stream or portion thereof and/or retrieving the recorded network data stream or portion thereof.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stream(s) includes one or more stream). Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Accordingly and in an embodiment, provided herein is a system for secure network routing and data recording comprising: a communication processing module; a secure hardware module operably coupled to the communication processing module; a network switch in two way communication with the communication processing module; a non-volatile memory module in two way communication with the communication processing module; and a central processing unit coupled to a transceiver, the central processing unit having thereon a processor-readable medium coupled to a memory having thereon a set of instructions configured to transmit and receive data from the communication processing module, wherein the secure hardware module is adapted to provide a selectably reversible temporospatial disconnect among the network's: data link layer, and/or network layer, and/or transport layer, and/or application layer and/or a combination of the foregoing, wherein (i) the network data stream is recorded in the non-volatile memory module, (ii) is encrypted (iii) using advanced encryption standard (AES), triple data encryption standard (3DES) or a combination thereof, wherein (iv) the secure hardware module further comprises a firmware with a decryption key configured to decrypt the encrypted data, (v) the decryption key is a pre-shared device-specific decryption key, wherein (vi) the central processing unit is in communication with the communication processing module via a management port, (vii) the management port is at least one of a USB port, a Serial port, a RJ45 port, and a Fiber port, wherein (viii) the network switch further comprises a plurality of network ports, and (ix) comprising an encryption accelerator in communication with at least the communication processing module and the hardware secure module, wherein (x) the communication processing module is further adapted to provide a root certificate operating as trust anchor for the whole system.

In another embodiment, provided herein is a method for secure routing and recording of network data stream passing through a network switch implementable in a system comprising a communication processing module, a secure hardware module operably coupled to the communication processing module, a network switch having a plurality of network ports in two way communication with the communication processing module, a non-volatile memory module in two way communication with the communication processing module, and a central processing unit coupled to a transceiver, the central processing unit having thereon a processor-readable medium coupled to a memory having thereon a set of instructions configured to transmit and receive data from the communication processing module, wherein the secure hardware module is adapted to provide a selectably reversible, temporospatial disconnect among the network's: data link layer, and/or network layer, and/or transport layer, and/or application layer and/or a combination of the foregoing, the method comprising receiving a network data stream through the network ports to the network switch; based on predetermined criteria, routing the network data stream or portions thereof to the communication processing module via a data conduit; using the communication processing module, processing the network data stream or portion thereof thereby recording the network data stream; and storing the recorded network data stream or portion thereof on the non-volatile memory module, the method (xi) further comprising: using the central processing unit and via a management port, at least one of modifying the recorded network data stream or portion thereof and retrieving the recorded network data stream or portion thereof, (xii) authenticating the central processing unit using a secure handshake protocol, wherein (xiii) the system further comprises an encryption accelerator in communication with at least one of the communication processing module, and the hardware secure module, wherein (xiv) the recorded network data stream is encrypted, (xv) using advanced encryption standard (AES), triple data encryption standard (3DES) or a combination thereof, wherein (xvi) the secure hardware module further comprises a firmware with a decryption key configured to decrypt the encrypted data, (xvii) the decryption key is a pre-shared device-specific decryption key, wherein (xviii) the management port is a USB port, a Serial port, a RJ45 port, or a Fiber port, wherein (xix) the secure hardware module is further adapted to provide tamper protection to the system, the method further comprising (xx) selectively blocking one or more of the network data stream(s), (xxi) wherein selectively blocking the data stream(s) comprises at least one of: transporting the data without recording, transporting the network data stream(s) and recording the network data stream(s), blocking the network data stream(s) from transport to the central processing unit and recording the network data stream(s), blocking the network data stream(s) from transport to the central processing unit, and logging as an event, and wherein (xxii) the communication processing module, or the hardware secure module further is operably coupled to a memory having a code thereon of a root certificate operating as trust anchor for the whole system.

In yet another embodiment, provided herein is an apparatus for providing secure routing and recording of a network data stream passing through a network switch, the apparatus comprising: circuitry and a communication processor in communication with a non-volatile memory having thereon processor-readable firmware, the communication processor and circuitry adapted to provide a selectably reversible, temporospatial disconnect among the network's: data link layer, and/or network layer, and/or transport layer, and/or application layer and/or a combination of the foregoing, wherein (xxiii) the firmware further comprises a set of instructions configured to decrypt the network data stream using a decryption key, (xxiv) the decryption key is a pre-shared decryption key that is specific to the apparatus, wherein (xxv) the firmware further comprises a set of instructions configured to provide tamper protection, and (xxvi) further comprises a root certificate operating as trust anchor, and wherein the apparatus (xxvii) further comprising an encryption/decryption accelerator.

Although the foregoing disclosure has been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

What is claimed:

1. A system for secure local area network (LAN) routing and data recording comprising:
    a. a security audit module included in a secure hardware module, executed by the communication processor, the security audit module being in communication with a network switch, configured for conducting periodical security audit;
    b. a non-volatile memory module in two-way communication with the communication processor; and
    c. a central processor coupled to a transceiver, the central processor having thereon a processor-readable medium coupled to a non-volatile memory storage device having thereon a set of executable instructions configured to, when executed, to cause the processor included in the central processor to:
        i. transmit and receive data stream from the communication processor via an internal management port;
        ii. based on predetermined criteria, rout the network data stream or portions thereof to the communication processor via a data conduit;
        iii. using the communication processor, process the network data stream or portion thereof to record the network data stream;
        iv. using established, port specific rules, selectively block the network data stream or portions thereof;
        v. using the security audit module, review the established rules at a predetermined period;
        vi. using the security audit module, review at least one of: the transported network data not blocked, and the blocked network data at any given network layer;
        vii. make changes to the port-specific rules for selectively blocking the network data stream or portions thereof;
        viii. using an encryption/decryption accelerator module included in the system, decrypt the encrypted network data stream or portion thereof;
        ix. analyze the decrypted data stream or portion thereof, based on the established port-specific rules;
        x. when detect that the decrypted data stream or portion thereof, meets the established port-specific rules;
        xi. encrypt the decrypted data stream or portion thereof; and
        xii. store the encrypted data stream or portion thereof on the non-volatile memory storage device;
    wherein the secure hardware module is adapted to provide a selectably reversible temporospatial disconnect among the network's OSI: data link layer, and/or network layer, and/or transport layer, and/or application layer and/or a combination of the foregoing.

2. The system of claim 1, wherein the network data stream is recorded in the non-volatile memory module.

3. The system of claim 2, wherein the recorded network data stream is encrypted.

4. The system of claim 3, wherein the network data stream is encrypted using advanced encryption standard (AES), triple data encryption standard (3DES) or a combination thereof.

5. The system of claim 3, wherein the secure hardware module further comprises a firmware with a decryption key configured to decrypt the encrypted data.

6. The system of claim 5, wherein the decryption key is a pre-shared device-specific decryption key.

7. The system of claim 1, wherein the central processing unit is in communication with the communication processing module via a management port.

8. The system of claim 1, wherein the management port is at least one of: a USB port, a Serial port, a RJ45 port, and a Fiber port.

9. The system of claim 1, wherein the network switch further comprises a plurality of network ports.

10. The system of claim 1, further comprising an encryption accelerator in communication with at least one of the communication processing module and the hardware secure module.

11. The system of claim 1, wherein the communication processing module is further adapted to provide a root certificate operating as trust anchor for the whole system.

12. A method for secure routing and recording of local area network (LAN) data stream passing through a network switch implementable in a computerized system comprising a security audit module in communication with at least one of a communication processing module and a network switch, each included in the system, the security audit module configured for conducting periodical security audit, a non-volatile memory module in two way communication with the communication processing module, and a central processing unit coupled to a transceiver, the central processing unit having thereon a processor-readable medium coupled to a non-volatile memory storage device having thereon a set of executable instructions configured to transmit and receive data from the communication processing module, wherein the secure hardware module is adapted to provide a selectably reversible, temporospatial disconnect among the network's OSI: data link layer, and/or network layer, and/or transport layer, and/or application layer and/or a combination of the foregoing, the method comprising
a. receiving a network data stream through the network ports to the network switch;
b. based on predetermined criteria, routing the network data stream or portions thereof to the communication processing module via a data conduit;
c. using the communication processing module, processing the network data stream or portion thereof thereby recording the network data stream;
d. using the security audit module and based on established rules, selectively blocking the network data stream(s);
e. using the security audit module, periodically reviewing the established rules;
f. using the security audit module, review at least one of: the transported network data not blocked, and the blocked network data at any given network layer;
g. using an encryption/decryption accelerator module included in the system, decrypting the encrypted network data stream or portion thereof;
h. analyze the decrypted data stream or portion thereof, based on the established port-specific rules;
i. upon detecting that the decrypted data stream or portion thereof, meets the established port-specific rules, encrypting the decrypted data stream or portion thereof; and
j. storing the encrypted data stream or portion thereof on the non-volatile memory storage device.

13. The method of claim 12, further comprising: using the central processing unit and via a management port, further performing at least one step of: modifying the recorded network data stream or portion thereof, and retrieving the recorded network data stream or portion thereof.

14. The method of claim 13, further comprising authenticating the central processing unit using a secure handshake protocol.

15. The method of claim 12, wherein the system further comprises an encryption accelerator in communication with at least one of the communication processing module, and the hardware secure module.

16. The method of claim 15, wherein the recorded network data stream is encrypted.

17. The method of claim 16, wherein the recorded network data stream is encrypted using advanced encryption standard (AES), triple data encryption standard (3DES) or a combination thereof.

18. The method of claim 15, wherein the secure hardware module further comprises a firmware with a decryption key configured to decrypt the encrypted data.

19. The method of claim 18, wherein the decryption key is a pre-shared device-specific decryption key.

20. The method of claim 13, wherein the management port is a USB port, a Serial port, a RJ45 port, or a Fiber port.

21. The method of claim 12, wherein the secure hardware module is further adapted to provide tamper protection to the system.

22. The method of claim 12, further comprise selectively blocking the network data stream(s).

23. The method of claim 22, wherein the established rules for selectively blocking the data stream(s) using the security audit module, comprises rules established for: transporting the data without recording, transporting the network data stream(s) and recording the network data stream(s), blocking the network data stream(s) from transport to the central processing unit and recording the network data stream(s), or blocking the network data stream(s) from transport to the central processing unit and logging as an event.

24. The method of claim 23, wherein the system further comprises a security audit module in communication with at least one of the communication processing module and the network switch for conducting periodical security audit, the method further comprising:
a. on a predetermined period, reviewing the established rules;
b. optionally, reviewing at least one of the transported network data not blocked, and the blocked network data at any given network layer.

25. The method of claim 12, wherein the communication processing module, or the hardware secure module further is operably coupled to a memory having a code thereon of a root certificate operating as trust anchor for the whole system.

26. An apparatus for providing secure routing and recording of a network data stream passing through a local area network (LAN) switch, the apparatus comprising: a security audit module in communication with at least one of a communication processing module and a network switch, each included in the apparatus, configured for conducting periodical security audit, and the communication processor in communication with a non-volatile memory having thereon a processor-readable firmware, the communication processor and circuitry adapted to provide a selectably reversible, temporospatial disconnect among the network's OSI: data link layer, and/or network layer, and/or transport layer, and/or application layer and/or a combination of the foregoing, wherein the processor-readable firmware comprises a set of executable instructions configured, when executed, to cause the communication processor to:
a. transmit and receive data stream from the communication processing module via an internal management port;
b. based on predetermined criteria, rout the network data stream or portions thereof to the communication processing module via a data conduit;
c. using the communication processing module, process the network data stream or portion thereof to record the network data stream;
d. using established, port specific rules, selectively block the network data stream or portions thereof;
e. using the security audit module, review the established rules at a predetermined period;
f. using the security audit module, review at least one of: the transported network data not blocked, and the blocked network data at any given network layer;
g. make changes to the port-specific rules for selectively blocking the network data stream or portions thereof;
h. using an encryption/decryption accelerator module included in the system, decrypt the encrypted network data stream or portion thereof;
i. analyze the decrypted data stream or portion thereof, based on the established port-specific rules;
j. when detect that the decrypted data stream or portion thereof, meets the established port-specific rules;
k. encrypt the decrypted data stream or portion thereof; and
l. store the encrypted data stream or portion thereof on the non-volatile memory storage device.

27. The apparatus of claim 26, wherein the firmware further comprises a set of instructions configured to decrypt the network data stream using a decryption key.

28. The apparatus of claim 27, wherein the decryption key is a pre-shared decryption key that is specific to the apparatus.

29. The apparatus of claim 26, wherein the firmware further comprises a set of instructions configured to provide tamper protection.

30. The apparatus of claim 26, wherein the firmware further comprises a root certificate operating as trust anchor.

31. The apparatus of claim 26, further comprising an encryption/decryption accelerator.

32. The apparatus of claim 26, wherein the OSI layers reversibly and selectively disconnected are L1-L7.

33. The system of claim 1, wherein the OSI layers reversibly and selectively disconnected are L1-L7.

* * * * *